C. W. STONE.
CASING TONGS.
APPLICATION FILED JULY 8, 1908.
955,560.
Patented Apr. 19, 1910.
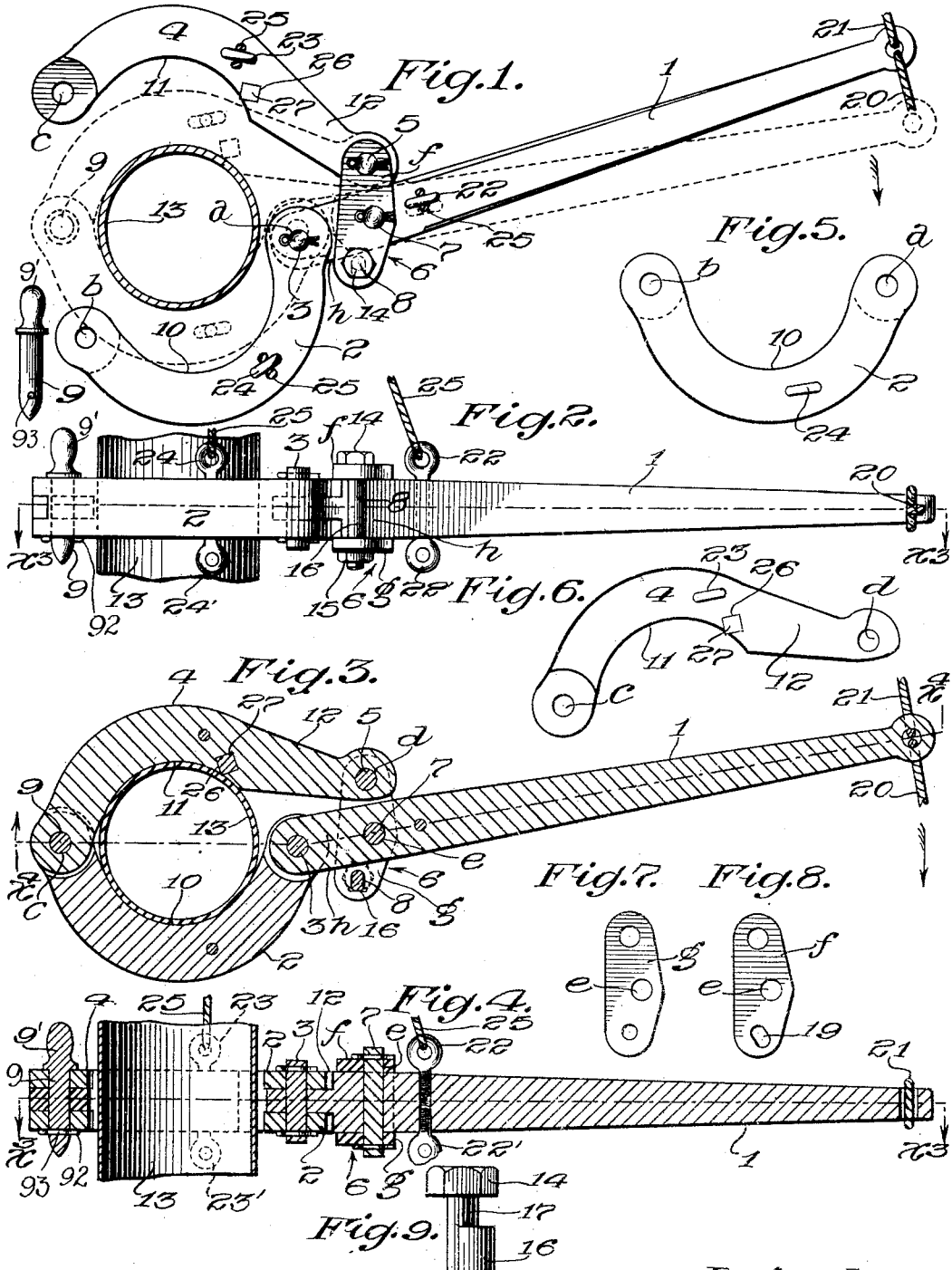

UNITED STATES PATENT OFFICE.

CHARLES W. STONE, OF HOLLYWOOD, CALIFORNIA, ASSIGNOR OF ONE-HALF TO ARTHUR FREMONT GILMORE, OF LOS ANGELES, CALIFORNIA.

CASING-TONGS.

955,560.  Specification of Letters Patent.  Patented Apr. 19, 1910.

Application filed July 8, 1908. Serial No. 442,604.

*To all whom it may concern:*

Be it known that I, CHARLES W. STONE, a citizen of the United States, residing at Hollywood, in the county of Los Angeles and State of California, have invented a new and useful Casing-Tongs, of which the following is a specification.

The object of this invention is to provide a wrench of minimum number of parts which will afford a frictional grip upon a well-casing so as to rotate the same under high pressures without slipping and without liability of denting the casing or injuring the same in any way.

The invention is designed to apply the pressure so evenly on all sides of the casing as to avoid the necessity of using any bit to bite into or take hold of the surface of the casing, but provision may be made for insertion of such bit in case the tongs are to be used upon casings covered with oil.

The accompanying drawings illustrate the invention.

Figure 1 is a plan view of a casing tongs constructed in accordance with this invention. The gripping levers are shown open in solid lines. Dotted lines indicate the position of said levers when in place on a casing, which is shown in solid lines. Fig. 2 is a side elevation of the tongs in position for operation on a well casing, a fragment of which is shown. Fig. 3 is a plan section on line indicated by $x^3$, Figs. 2 and 4. Fig. 4 is a section indicated on line $x^4$, Fig. 3. Fig. 5 is a view of the gripping lever 2 detached. Fig. 6 is a view of the gripping lever 4 detached. Fig. 7 is a view of one member of the connecting link. Fig. 8 is a view of the other member of the connecting link. Fig. 9 is a view of the stop bolt.

1 is the handle of the tongs.

2 is a gripping lever pivoted by a pin 3 to one end of the handle. 4 is another gripping lever pivoted by a pin 5 to a link 6 that is pivoted by a pin 7 to the handle 1 at a distance from the pin 3, and is provided with a stop 8 to engage a side of the handle 1. The link 6 is normally located crosswise of the handle 1, and the pin 7 is intermediate of the pin 3 and the free end of the handle and in line therewith. The two gripping levers 2 and 4, have normally free ends provided with seats $c$ and $b$ to receive a latch pin 9; said gripping levers are arranged to swing toward and from the produced medial line of the handle lever 1, so that they may temporarily be brought together as indicated in dotted lines in Fig. 1, and there secured by the latching device 9 which then serves as a fulcrum upon which the temporarily connected ends of the gripping levers 2 and 4 are pivoted. By this construction and arrangement which is broadly new and heretofore unknown, the gripping appliances of the tongs are more conveniently adjustable onto and off from the casing, as will hereinafter more fully appear. The latching device is preferably a pin 9, having at one end an enlarged head 9' that serves as a handle and that is larger than the seats $b$ and $c$ so that when the pin 9 is inserted through the seats after the free ends of the gripping levers 2 and 4 have been brought together for that purpose, the latching pin rests in said seats and may be secured therein by a cotter pin 92 inserted through a hole 93 in the lower end of the pin.

The gripping lever 2 is provided with a segmental face 10 to engage the outside of a casing of a definite size, and the seats $a$, $b$, in said lever for the pins 3 and 9 are diametrically opposite each other relative to the circle of said segmental face. The gripping lever 4 is provided with a segmental face 11 of a radius corresponding to that used in forming the face 10. Said lever 4 is provided with an extension 12 to receive the pin 5. The seat $c$ in the lever 4 for the fulcrum pin 9, and the seats $a$, $b$, of the lever 2 for the pins 3 and 9 are all approximately equidistant from a center from which the faces 10 and 11 are inscribed, and the seats $a$, $b$, are diametrically opposite each other relative to such center. The pin seats $d$ and $e$ of the pins 5 and 7 in the gripping lever 4 and the handle 1 respectively are approximately equidistant from the center from which the gripping faces 11 and 10 are inscribed when the tongs are closed. The seat $e$ may, as shown in Fig. 3, be located somewhat nearer the center from which the face 10 of the lever 2 is inscribed than is the seat $d$ relative to the center from which the face 11 of the lever 4 is inscribed, when the tongs are closed. The purpose of locating the several pins as described is to provide a compound leverage for drawing the faces 10 and 11 toward each other when the tongs are in place on the casing 13.

The stop 8 is designed to limit the swing of the handle 1, and consequently the spread of the levers 2 and 4. Said stop 8 is preferably a bolt provided with a head 14 on one end and a nut 15 on the other end, and with an eccentric projection 16 intermediate cylindrical portions 17, 18, which rotate in members $f$, $g$, of the link 6. Both of said members are pivotally held by the pins 5 and 7. One of said members is provided with a slot 19 to allow the eccentric projection 16 of the pin to pass through and come between the members $f$, $g$, and allow the bolt to turn.

The eccentric projection 16 of the bolt 8 is equal to or slightly greater in length than the thickness of the handle 1 so that the nut 15 may be tightened to clamp the member $g$ of the link against the eccentric 16 to hold the bolt 8 friction tight against rotation without clamping the members $f$, $g$, on the handle 1. By loosening the nut 15 and turning the bolt 8 to cause the eccentric to come more or less into the way of the arm $h$ of the handle 1 between the pivots 7 and 3, the releasing movement of the handle 1 may be limited to a greater or less extent.

20 is a jerk-line fastened to the handle to draw the free end thereof in one direction to swing the handle as a lever on the pivot 7 to draw the pivot 3 toward the extension 12 of the lever 4.

21 designates a draw-back line which may be connected in the usual manner with means as a pulley and weight not shown, for returning the lever on the back stroke.

22, 23, 24 designate eyes on the handle 1 and levers 4 and 2 respectively, by which the tongs may be suspended by connections as one or more lines 25 suspended from the usual derrick, not shown.

In practice, the tongs when not in use will be opened opposite the handle by removal of the fulcrum pin 9, as shown in Fig. 1, and when it is desired to use the tongs the same will be suspended by the line 25 and brought into position as indicated in Fig. 1, and the levers 2 and 4 will be closed upon the casing 13 and secured by the fulcrum pin 9. An important object of providing the latch pin 9 having a handle 9' and readily inserted into and withdrawn from the seats $b$, $c$, is to expedite the application of the tongs to and withdrawal from the casing when the tongs are suspended by the lines 25. The gripping levers when swung apart from the medial line of the handle lever, as shown in solid lines in Fig. 1, are well-balanced and the tongs may be moved with great ease, convenience and expedition toward and from the casing, and when brought into position, the free ends of the gripping levers can be quickly swung together by an operator standing on that side of the casing. This feature is of great importance in the operation of screwing and unscrewing vertical pipe, such as well casing of large diameter. The jerk-line 20 and the draw-back 21 being applied, the engine, not shown, may be started into operation, thus drawing the line 20 in the direction indicated by the arrow in Fig. 3, thus causing the handle 1 to operate as a lever fulcrumed at 7 to swing together the levers 2 and 4 fulcrumed at 9 to overcome the resistance offered by any antifriction substance or surface on the casing, thus affording a tight grip on the casing, and forcing it to turn. When the jerk-line is loosened, the draw-back 21 comes into operation to return the handle 1 in the opposite direction. Thereupon the handle swings on the pivot 7 to spread apart the levers 2 and 4, thus releasing the grip upon the casing, and thereupon the arm $h$ is engaged between the pivots 7 and 3 by the stop 8, preventing undue spreading apart of the levers 2 and 4. Then the engine is again operated to draw the jerk-line, and the operation just described is repeated until the casing is screwed home. To unscrew the casing, the tongs will be inverted and suspended from the eyes 22', 23', 24' and the jerk-line being applied as before, but on the opposite side of the casing, will be made effective to rotate the casing in the opposite direction to unscrew the same. It is to be understood that the tongs may be suspended from a single line 25 and that the draw-back may be dispensed with, and that no claim is made for operating the tongs by means of a jerk-line applied as shown.

26 designates a seat for a bit 27, which may be applied and removed at the pleasure of the operator to insure against slipping when a casing covered with oil is to be screwed.

The slot 19 in the link $f$ is set obliquely as shown in Fig. 8, in order to allow the eccentric stop 8 to be turned out of register therewith when in operative position to serve as a stop, so that the projection 16 may at all times be clamped between members of the link. The lever, gripping members and links are pivotally fastened to each other by pivots and pin 3, 5, 7 and 9 so that the tongs can be used on back and forward strokes without liability of becoming disconnected.

I claim:—

1. A well casing tongs comprising a handle lever; a link pivotally fastened thereto; two gripping levers, one being pivoted to the link and the other being pivoted to the handle lever; said gripping levers having normally free separate ends adapted to swing toward and from the produced medial line of the handle lever to receive and inclose the casing to be turned, and to release the same; and latching means to temporarily pivot the said normally free ends together.

2. A casing tongs comprising a handle lever; a link pivotally fastened thereto; two gripping levers, one pivoted to the link and the other pivoted to the handle lever; said gripping levers having normally free separate ends adapted to swing toward and from the produced medial line of the handle lever to receive and encircle the casing to be turned, and to release the same; said free ends being provided with seats; and a latching pin to fit said seats for the purpose of temporarily pivoting said free ends together.

3. A casing tongs comprising a handle lever; a link pivotally fastened thereto; two gripping levers, one pivoted to the link and the other pivoted to the handle lever; said gripping levers having normally free separate ends adapted to swing toward and from the produced medial line of the handle lever to receive and encircle the casing to be turned, and to release the same; said free ends being provided with seats; a latching pin to fit said seats for the purpose of temporarily pivoting said free ends together; and means to temporarily fasten said pin in said seats.

4. A handle lever, a link pivoted to the handle lever, a stop to limit the pivotal movement of the handle lever relative to the link, a gripping lever pivoted to an arm of the handle lever, a gripping lever provided with an extension and pivoted to the link, and a pin pivoting the ends of the gripping levers together.

5. A handle lever, a link pivoted to the handle lever, an adjustable cam stop to limit the pivotal movement of the handle lever relative to the link, a gripping lever pivoted to an arm of the handle lever, a gripping lever provided with an extension and pivoted to the link, and a pin pivoting the ends of the gripping levers together.

6. A casing tongs comprising a handle lever, two gripping levers of different lengths, a pin provided with a handle, said gripping levers being adapted to be thereby detachably pivoted together, the shorter being pivoted directly to the handle lever and the longer being provided with an extension; and a link pivotally fastened to and connecting the extension and the handle lever.

7. A casing tongs comprising a handle lever, two gripping levers of different lengths detachably pivoted together, the shorter being pivoted directly to the handle lever and the longer being provided with an extension; a link comprising two members on opposite sides of and pivotally connecting the extension and the handle lever, a bolt provided with an eccentric between the link members and a nut to clamp one of said members against the eccentric.

8. A casing tongs comprising a handle-lever, a link pivotally fastened to said handle-lever intermediate of its ends and crosswise thereof, a gripping lever pivotally fastened to the inner arm of the handle-lever, a second gripping lever pivotally fastened to the link, and a pin pivotally fastening the ends of the gripping levers together.

9. A tongs comprising a handle-lever, a link pivotally fastened to said handle-lever intermediate of its ends and crosswise thereof; two gripping levers, one being pivotally fastened to the inner arm of the handle-lever, and the other being provided with an extension which is pivotally fastened to the link; and means for pivotally fastening the ends of the two gripping levers together.

10. A tongs comprising two gripping-levers provided with segmental faces, one of said levers being provided with an extension, a handle-lever comprising an inner and an outer arm, the inner arm being pivotally connected to the second gripping-liver; a link pivotally fastened to the handle-lever at the junction of said arms and to said extension, and a pin pivotally fastening the gripping-levers together, the pin and the connection between the second lever and the inner arm of the handle and the connection between the link and the handle being normally in a straight line.

11. A tongs comprising a handle-lever consisting of an inner and an outer arm, two gripping levers detachably pivoted together, a pin connecting one of said gripping-levers to the inner arm of the handle-lever, and a link connecting the second gripping-lever to the junction of the two arms of the handle-lever, said link being normally crosswise of the handle-lever, and a connection between the two gripping-levers, said connection between the two gripping-levers and the connection between the first gripping-lever and the inner end of the handle-lever and the connection between the link and the handle-lever being normally in a straight line.

In testimony whereof, I have hereunto set my hand at Los Angeles, California, this 24th day of June, 1908.

CHARLES W. STONE.

In presence of—
 JAMES R. TOWNSEND,
 JULIA TOWNSEND.